United States Patent [19]

Pelser

[11] 4,071,113

[45] Jan. 31, 1978

[54] SUPPORT STRUCTURE

[76] Inventor: Eric W. Pelser, 1160 Heald Road, Victoria, British Columbia, Canada

[21] Appl. No.: 640,243

[22] Filed: Dec. 12, 1975

[51] Int. Cl.[2] .............. F16M 11/00

[52] U.S. Cl. .............. 182/181; 182/151; 182/185

[58] Field of Search .............. 182/181-186, 182/224, 226, 225, 151

[56] References Cited

U.S. PATENT DOCUMENTS

| | | | |
|---|---|---|---|
| 1,204,648 | 11/1916 | Cavaline | 182/181 |
| 2,198,956 | 4/1940 | Thielepape | 182/181 |
| 2,648,931 | 8/1953 | Deveau | 248/460 |
| 3,941,209 | 3/1976 | Adams | 182/186 |

FOREIGN PATENT DOCUMENTS

| | | | |
|---|---|---|---|
| 617,838 | 7/1947 | France | 182/224 |
| 90,851 | 11/1937 | Sweden | 182/224 |

*Primary Examiner*—Reinaldo P. Machado

[57] ABSTRACT

A sawhorse primarily designed to be easily assembled or disassembled comprising a cross-beam and leg assemblies wherein said cross-beam is reduced in its end portions and engages Vee-shaped crotches that are defined in the upper portions of said leg assemblies and held in place by U-shaped bolts.

1 Claim, 2 Drawing Figures

SUPPORT STRUCTURE

This invention relates generally to support structures and more specifically to saw horses as commonly used by carpenters and handymen.

The saw horse of the present invention can be knocked down for storage and quickly assembled for use with a single tool that a carpenter always has at hand, namely a claw hammer.

It has been known to provide saw horses with legs that fold against each other or into the recess provided by a channel shaped crossbeam.

It has been known to provide an all-metal saw horse. This would not be practical when working with wood and could be hazardous when working with power tools.

The disadvantages of saw horses with foldable legs is that they are prone to jamming and bending, particularly in the bracing struts that are necessitated in this type of construction.

Since the present invention uses wood as the material of construction, any of its components can be easily replaced in the event of damage or breakage, and by the handyman himself.

An additional benefit in using wood as the material of construction is that it will provide a boon to the cedar and plywood industry, which is in a depressed state at the present time.

It is thus seen that prior disadvantages are overcome by the present invention which has the additional advantage of being quick assembly-knockdown structure, compact in storage and rigidly unified on assembly.

A preferred embodiment of the invention is illustrated in the accompanying drawing wherein.

Figure 1:
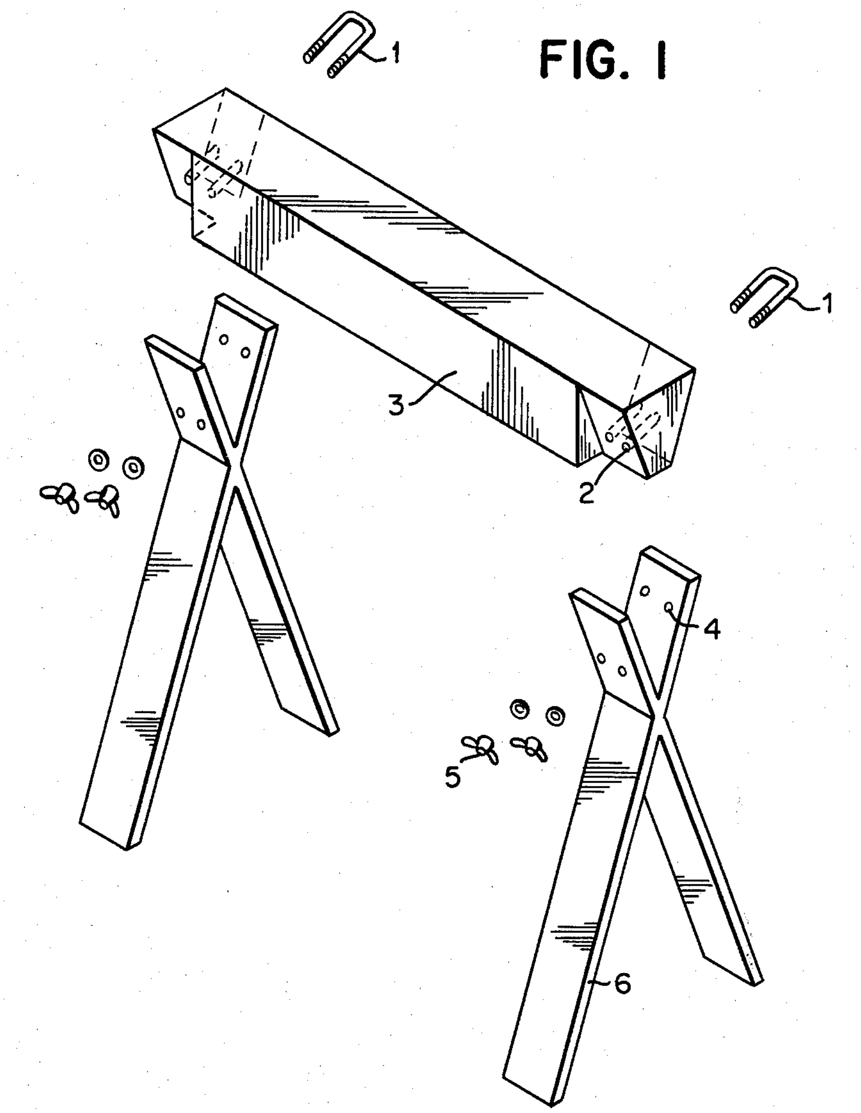
FIG. 1 is an exploded view of the invention.

A preferred angle for the end cuts in the cross-beam is 20° from the vertical so that the reduced end portions are in the shape of a flat-bottomed "V". The distance in, of the cuts longitudinally, is determined by the width of the leg members.

The leg members are angle out to interengage in the form of an "X." More specifically, this is a middle lap on edge, angle cut to provide complementary seating surfaces for the cross-beam in the upper portions of the leg members. It is thus seen that the notches out portions of the crossbeam give it a nonrotatable mounting in the leg members. Means to secure the whole into a rigid assembly will now be described with reference to the drawing figures.

Figure 2:
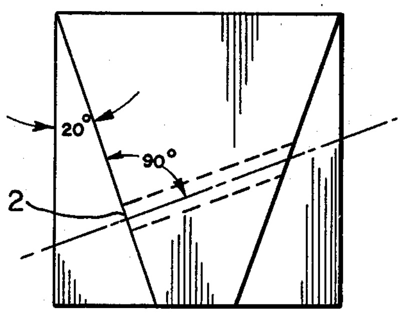
FIG. 2 is a true end view of the cross-beam showing the configuration of its end portions, as provided by end cuts.

As Shown in FIG. 1,

U-bolts 1 are driven through inclined holes 2 in the cross-beam 3 and through mating holes 4 in the upper portions of the leg members 6. Holes 2, however, have a specific relationship to the notched out portions of the cross-beam in that they are normal to one inclined surface and obliquely angled to the opposite inclined surface. This feature is shown in FIG. 2.

With reference again to FIG. 1, Wing nuts and washers 5 are secured to the free ends of the U-bolts. The assembled structure is extremely rigid and stable even under off-centre loading.

It is seen then that the present invention overcomes the difficulties and inconveniences of prior devices in a novel manner.

The embodiments of the invention in which an exclusive property or privilege is claimed are defined as follows:

1. A support structure comprising a cross-beam and leg assemblies, wherein the cross-beam is reduced in its end portions in the shape of trapeziums that wedgingly engage Vee-shaped crotches that are defined in the upper portions of the leg assemblies, said wedging engagement leaving spaces between the undersides of the trapeziums and the bottoms of the Vee crotches in the leg assemblies, holes in said cross-beam end portions and said upper portions of said leg assemblies, and U-bolts having an angle of entry through said holes that bears an oblique relationship to one inclined face of each trapezium and a 90° relationship to the opposite inclined face of each trapezium, and wherein wing nuts engage the protruding ends of each U-bolt adjacent to the inclined trapezium face that bears said 90° relationship, wherein all the components are locked into a rigid assembly.

* * * * *